US007265360B2

(12) United States Patent
Baker et al.

(10) Patent No.: US 7,265,360 B2
(45) Date of Patent: Sep. 4, 2007

(54) MAGNETRON ANODE DESIGN FOR SHORT WAVELENGTH OPERATION

(75) Inventors: C. Vincent Baker, Tucson, AZ (US); James G. Small, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 19 days.

(21) Appl. No.: 10/982,591

(22) Filed: Nov. 5, 2004

(65) Prior Publication Data

US 2006/0097183 A1 May 11, 2006

(51) Int. Cl.
*G01J 1/42* (2006.01)
*H01J 25/55* (2006.01)

(52) U.S. Cl. ................ 250/393; 315/39.77; 315/39.73; 315/39.65; 315/39.75

(58) Field of Classification Search ............ 315/39.51, 315/3.5, 39.77, 39.73, 39.65, 39.75
See application file for complete search history.

(56) References Cited

U.S. PATENT DOCUMENTS

| | | | | |
|---|---|---|---|---|
| 2,462,510 A | | 2/1949 | Korman | 42/15 |
| 3,646,389 A | * | 2/1972 | Hentschel | 315/3.5 |
| 3,860,880 A | | 1/1975 | Yariv et al. | 330/5 |
| 4,410,833 A | * | 10/1983 | Ganguly et al. | 315/39.51 |
| 4,465,953 A | | 8/1984 | Bekefi | 315/39.71 |
| 4,709,129 A | * | 11/1987 | Osepchuk | 219/761 |
| 4,742,272 A | | 5/1988 | Kusano et al. | 315/39.69 |
| 5,084,651 A | * | 1/1992 | Farney | 315/39.51 |
| 5,280,218 A | | 1/1994 | Smith | 315/39.3 |
| 5,629,225 A | | 5/1997 | Iwakiri et al. | 438/397 |
| 5,635,797 A | * | 6/1997 | Kitakaze et al. | 315/39.51 |
| 5,675,210 A | | 10/1997 | Kim | 313/309 |
| 6,005,347 A | | 12/1999 | Lee | 315/39.63 |
| 6,064,154 A | | 5/2000 | Crouch et al. | 315/39.57 |
| 6,373,194 B1 | * | 4/2002 | Small | 315/39.51 |
| 6,504,303 B2 | * | 1/2003 | Small | 315/39.51 |
| 6,525,477 B2 | * | 2/2003 | Small | 315/39.51 |

(Continued)

FOREIGN PATENT DOCUMENTS

GB 574.551 1/1946

(Continued)

*Primary Examiner*—Tho Phan
*Assistant Examiner*—Chuc Tran
(74) *Attorney, Agent, or Firm*—Renner, Otto, Boisselle and Sklar, LLP

(57) ABSTRACT

An electromagnetic radiation source is disclosed. The electromagnetic radiation source includes an anode having a first conductor, a second conductor positioned relative to the first conductor, a plurality of pole pieces coupled to at least one of the first conductor and the second, and at least one mechanical phase reversal positioned along the first conductor or second conductor. Adjacent pole pieces are separated by a gap. The electromagnetic radiation source also includes a cathode separated from the anode by an anode-cathode space, electrical contacts for applying a dc voltage between the anode and the cathode and establishing an electric field across the anode-cathode space, and at least one magnet arranged to provide a dc magnetic field within the anode-cathode space generally normal to the electric field. Electrons emitted from the cathode are influenced by the electric and magnetic fields to follow a path through the anode-cathode space and pass in close proximity to the plurality of pole pieces, and the gaps between adjacent pole pieces provide fringing fields which interact with the electrons to produce single mode operation at a desired operating frequency.

73 Claims, 8 Drawing Sheets

U.S. PATENT DOCUMENTS

| | | | | |
|---|---|---|---|---|
| 6,538,386 | B2 * | 3/2003 | Small | 315/39.51 |
| 6,724,146 | B2 * | 4/2004 | Small | 315/39.77 |
| 2002/0070671 | A1 | 6/2002 | Small | 315/39.51 |
| 2003/0016421 | A1 * | 1/2003 | Small | 359/172 |

FOREIGN PATENT DOCUMENTS

| | | |
|---|---|---|
| GB | 628.752 | 9/1949 |

* cited by examiner

SMALL DIAMETER

PI MODE = 7.201 GHz

Q = 544

MAGNETRON ANODE DESIGN FOR SHORT WAVELENGTH OPERATION

FIELD OF THE INVENTION

The present invention relates generally to high frequency magnetrons and, more particularly, to magnetron anodes.

BACKGROUND OF THE INVENTION

Magnetrons are well known in the art and have long served as highly efficient sources of microwave energy. For example, magnetrons are commonly employed in microwave ovens to generate sufficient microwave energy for heating and cooking various foods. The use of magnetrons is desirable in that they operate with high efficiency, thus avoiding high costs associated with excess power consumption, heat dissipation, etc.

Conventional microwave magnetrons employ a constant electric and magnetic field to produce a rotating electron space charge. The electron space charge interacts with a plurality of microwave resonant cavities to generate microwave radiation. Conventional magnetrons are efficient generators of microwave energy for frequencies in the 1 to 10 GHz region. At higher frequencies, the maximum output power drops and the required electric and magnetic field strengths increases (at higher frequencies the resonant cavities become proportionally smaller). The practical upper frequency limit for conventional magnetron designs is about 100 GHz at about 1 Watt (W) of continuous power. By comparison, at 1 GHz, conventional magnetrons can produce several kilowatts of continuous power. In short pulses, most magnetron designs can produce peak powers 1000 times higher than their maximum continuous power levels. In pulse operation, multi-megawatt power levels are possible in the 1 to 10 GHz range.

Conventional magnetrons employ anodes which have a plurality of resonant cavities arranged around a cylindrical cathode. The resonant cavities typically number from six to twenty. They may be shaped as hole and slot-keyhole structures or as straight-sided pie-shaped structures. FIGS. 1A-1C illustrate several conventional magnetron anode designs, namely, the slot-keyhole, the straight-sided pie-shaped structure and the rising sun structure (i.e., an anode with resonant cavities having varying dimensions), respectively.

Mode control is an important issue in magnetron operation. A mode is a collective oscillation of all of the resonant cavities. In a single mode, all of the cavities may oscillate at substantially the same frequency but with some phase difference between adjacent cavities. The most desirable mode of operation occurs when adjacent cavities oscillate 180 degrees out of phase with each other or pi radians out of phase. This is known as pi-mode, and is the most power efficient mode. Numerous other modes are possible. For example, all cavities can oscillate in phase with each other, which is known as the zero pi-mode. Another possibility is that adjacent cavities oscillate pi/2 radians or 90 degrees out of phase with each other. In general, the number of distinct possible modes equals the number of resonant cavities. As more cavities are added, the number of possible modes increases.

Without some sort of mode control device, a magnetron can and will oscillate at any possible mode. Each mode has a slightly different oscillation frequency and power efficiency. Without mode control, a magnetron oscillator will jump about in frequency and power level in an uncontrolled manner.

The frequency and power limitations of conventional magnetron designs arise from a breakdown of mode control. Mode control is conventionally accomplished either by using strapping rings 10 as shown in FIGS. 1A and 1B, or by alternating the size of the resonant cavities 12 as in the rising sun design of FIG. 1C. As a practical matter, these prior art methods of mode control fail when the number of cavities exceed approximately twenty. Numbers higher than forty heretofore have been considered completely impractical.

Since the spacing of anode pole pieces depends directly on the operating wavelength, this limitation drives higher frequency designs to very small size and limits their power handling capability. The very small size also requires very large magnetic fields to maintain small radius electron orbits within the small device. At 100 GHz for example, the resonant cavities are reduced to a fraction of a millimeter in length. Such small pieces of metal may cause problems as a result of being unable to handle high-power levels without melting. Furthermore, as the anode diameter becomes smaller, impractically large magnetic fields are required to produce tighter electron orbits around the cathode.

With reference to FIG. 2, a conventional cylindrical magnetron 14 is provided with a central electron emitting cathode 16 and a circumferential anode 18 containing a plurality of resonant cavities 12. A high voltage source (not shown) is used to accelerate electrons from the cathode 16 to the anode 18 (the cathode is at negative potential and the anode is at positive potential), and an axial magnetic field 20 causes the electrons to follow curved orbits on their way from the cathode 16 to the anode 18. A power coupling port 19 provides a means to deliver the energy away from the resonant cavities 12. Planar (non-curved) magnetrons are also possible with similar operating principles. For clarity, only cylindrical magnetrons will be discussed.

During operation of the magnetron 14, an electron cloud rotates about an axis of symmetry within an interaction space, e.g., the space between the anode and cathode. As the cloud rotates, the electron distribution becomes bunched on its outer surface, thereby forming spokes of electronic charge that resemble the teeth on a gear. The operating frequency of the magnetron is determined by how rapidly the spokes pass from one gap to the next in one half of the oscillation period. The electron rotational velocity is determined primarily by the strength of a permanent magnetic field and the electric field which are applied to the interaction region.

FIG. 3 illustrates an expanded view of a portion of a conventional magnetron anode 18 in pi-mode operation. For simplicity, the curved structure is drawn straight. When operating in the desired pi-mode, adjacent resonant cavities 12 oscillate out of phase with each other. The space between the cathode and anode is filled with a rotating electron cloud 22. A high voltage accelerates the electrons from cathode 16 to anode 18 and supplies the electrical energy which is converted into microwave power.

At an instant of time during pi-mode operation, it can be seen that the microwave fringing fields 24 at the resonant cavity openings have alternating directions. The circulating electron cloud 22 sees electric fields across consecutive openings which go from plus to minus potential, then minus to plus, then plus to minus, etc. The result is that the surface of the metal pole pieces 26 between resonant cavity openings are alternately at either positive or negative potential.

Since electrons are attracted to positive and repelled from negative potentials, pi-mode operation serves to efficiently bunch the electron cloud 22.

The rotating electron cloud 22 interacts only with the fringing fields 24 between anode poles. The function of the multiplicity of microwave resonators 12 is to support and maintain the oscillating fringing fields 24. As taught in commonly assigned U.S. Pat. No. 6,724,146, a multiplicity of microwave resonators is not necessary to produce magnetron operation. It is sufficient to provide a multiplicity of anode pole pieces that support pi-mode at fringing fields across the anode openings.

For many practical reasons, the distance D between anode openings is typically a fraction of the operating wavelength, such as, for example, one-tenth or one-hundredth of the operating free space wavelength. The anode circumference of a typical prior art microwave-oven magnetron is about one-fifth the free space wavelength and contains ten resonators for a spacing D of about 1/50 wavelength. It is also known as a practical matter that mode control fails for magnetrons constructed with more than approximately twenty resonant cavities 12. From these two facts it can be seen that mode control is difficult when the circumference of the anode is larger than approximately one wavelength at the operating frequency.

Recently, the applicant has described a high frequency magnetron that is suitable for operating at frequencies heretofore not possible with conventional magnetrons. This high frequency magnetron is capable of producing high efficiency, high power electromagnetic energy at frequencies within the infrared and visible light bands, and which may extend beyond into higher frequency bands such as ultraviolet, x-ray, etc. As a result, the magnetron may serve as a light source in a variety of applications such as long distance optical communications, commercial and industrial lighting, manufacturing, etc. Such magnetron is described in detail in commonly assigned, U.S. Pat. No. 6,373,194 and U.S. Pat. No. 6,504,303, the entire disclosures of which are incorporated herein by reference.

This high frequency magnetron is advantageous as it does not require extremely high magnetic fields. Rather, the magnetron preferably uses a magnetic field of more reasonable strength, and more preferably a magnetic field obtained from permanent magnets. The magnetic field strength determines the radius of rotation and angular velocity of the electron space charge within the interaction region between the cathode and the anode. The anode includes a plurality of small resonant cavities which are sized according to the desired operating wavelength. A mechanism is provided for constraining the plurality of resonant cavities to operate in pi-mode. Specifically, each resonant cavity is constrained to oscillate pi-radians out of phase with the resonant cavities immediately adjacent thereto. An output coupler or coupler array is provided to couple optical radiation away from the resonant cavities in order to deliver useful output power.

Additionally, applicant has made further improvements to the magnetron, wherein the wavelength of operation may be in the microwave band, infrared light or visible light bands, or even shorter wavelengths. The magnetron converts direct current (dc) electricity into single-frequency electromagnetic radiation, and includes an array of phasing lines and/or inter-digitated electrodes that are disposed around the outer circumference of an electron interaction space. During operation, oscillating electric fields appear in gaps between adjacent phasing lines/inter-digitated electrodes in the array. The electric fields are constrained to point in opposite directions in adjacent gaps, thus providing pi-mode fields that are necessary for efficient magnetron operation. Such a magnetron is described in detail in commonly assigned U.S. Pat. No. 6,724,146, the entire disclosure of which is incorporated herein by reference.

Nevertheless, there remains a strong need in the art for even further advances in the development of high frequency electromagnetic radiation sources. For example, there remains a strong need for a device having improved operation at high frequencies, e.g., over 100 GHz, while operating at high power levels. More particularly, there is a strong need for a device which does not utilize multiple resonant cavities, thereby simplifying the construction of the magnetron. Such a device would offer greater design flexibility and would be particularly well suited for producing electromagnetic radiation at very short wavelengths and operating at high power levels.

SUMMARY OF THE INVENTION

One aspect of the invention relates to an electromagnetic radiation source. The electromagnetic radiation source includes an anode having a first conductor; a second conductor positioned relative to the first conductor; a plurality of inter-digitated pole pieces coupled to the first conductor or the second conductor, wherein adjacent pole pieces are separated by a gap; at least one mechanical phase reversal positioned along the first conductor or the second conductor, the mechanical phase reversal forcing a polarity change between pole pieces adjacent to the mechanical phase reversal. The electromagnetic radiation source further includes a cathode separated from the anode by an anode-cathode space; electrical contacts for applying a dc voltage between the anode and the cathode and establishing an electric field across the anode-cathode space; and at least one magnet arranged to provide a dc magnetic field within the anode-cathode space generally normal to the electric field.

A second aspect of the invention relates to a magnetron anode for short wavelength operation in a magnetron. The anode includes a first conductor; a second conductor positioned relative to the first conductor; a plurality of inter-digitated pole pieces coupled to the first conductor or the second conductor, wherein adjacent pole pieces are separated by a gap; and at least one mechanical phase reversal positioned along the first conductor or the second conductor, the mechanical phase reversal forcing a polarity change between pole pieces adjacent to the mechanical phase reversal.

A third aspect of the invention relates to a method of producing electromagnetic radiation in a magnetron. The magnetron includes an anode, a cathode, electrical contacts for applying a DC voltage between the anode and cathode, and at least one magnet arranged to provide a dc magnetic field within an anode-cathode space generally normal to the electric field, wherein the anode includes a plurality of interdigitated pole pieces coupled to a first conductor or a second conductor, the method including the steps of: applying a voltage to the anode and cathode thereby accelerating electrons from the cathode to the anode, wherein the electrons form a circulating electron cloud; forming at least one wave mode along a surface of the anode, wherein the wave mode develops a charge on the pole pieces and forms fringing fields; and compensating for a phase reversal of the wave mode, such that continuously in-phase fields are provided to the electron cloud.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

These and further features of the present invention will be apparent with reference to the following description and drawings, wherein:

FIG. 7A shows standing wave resonances in an anode with a circumference of 2 free-space wavelengths;

DESCRIPTION OF THE INVENTION

Figure 1A:
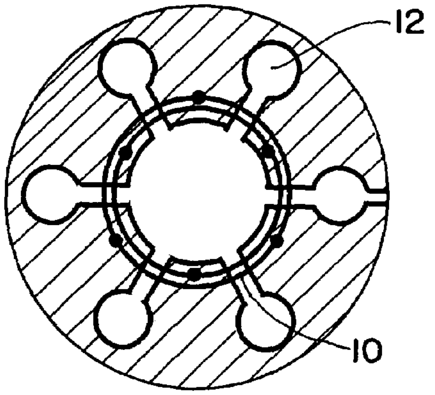
FIG. 1A is a schematic view of a prior art magnetron anode utilizing a slot-keyhole resonator design.
Figure 1B:
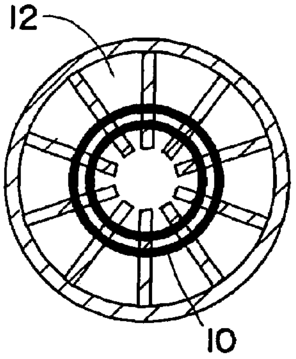
FIG. 1B is a schematic view of a prior art magnetron anode utilizing a straight-sided pie-shape resonator design.
Figure 1C:
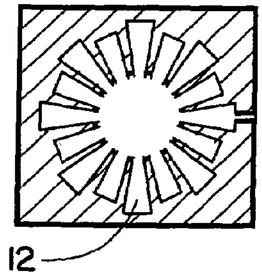
FIG. 1C is a schematic view of a prior art magnetron anode utilizing resonators having various dimensions.
Figure 2:
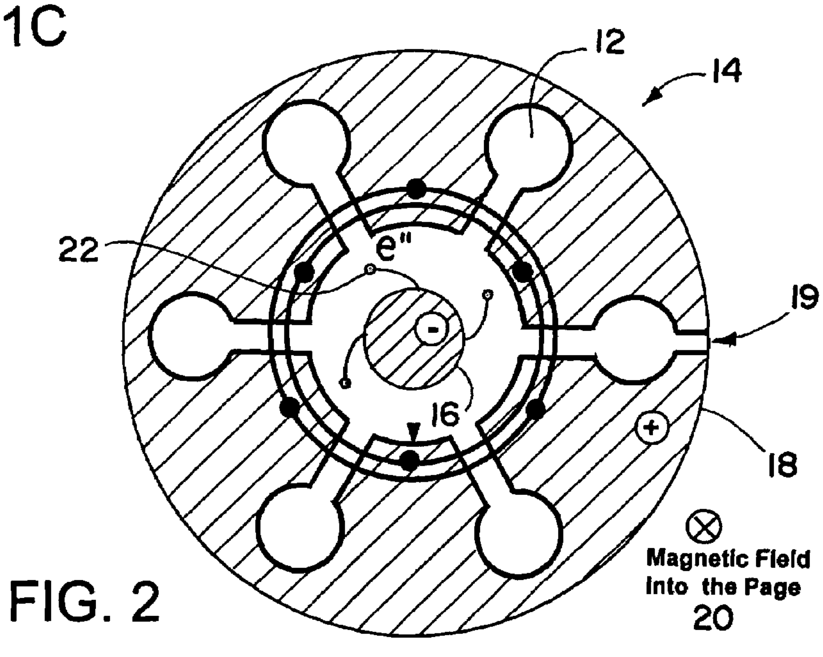
FIG. 2 illustrates a prior art magnetron utilizing the anode of FIG. 1A.
Figure 3:
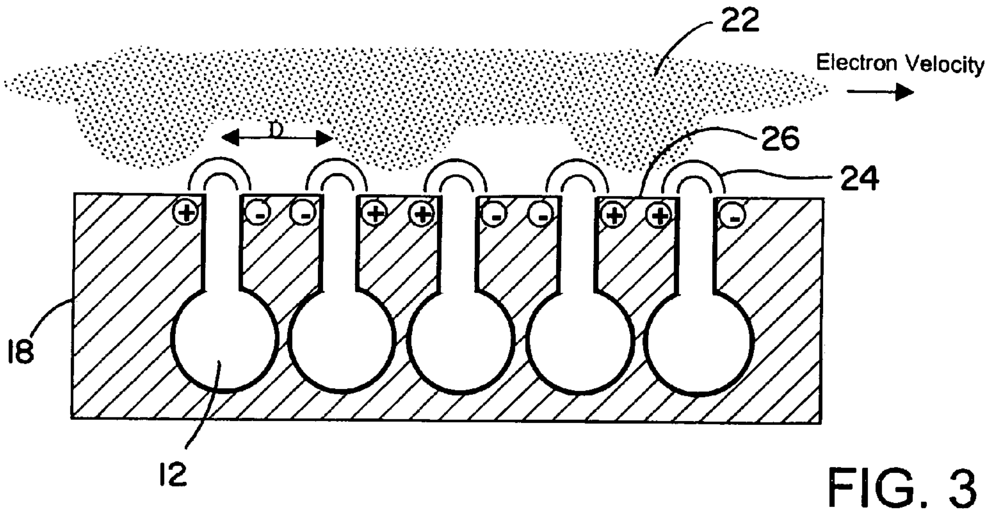
FIG. 3 is an expanded view of a portion of the anode of the magnetron of FIG. 2 during pi-mode operation.

The following is a description of the present invention with reference to the attached drawings, wherein like reference numerals will refer to like elements throughout. To illustrate the present invention in a clear and concise manner, the drawings may not necessarily be to scale.

The applicants have discovered that large anodes, e.g., anodes with a circumference larger than one free-space wavelength, exhibit traveling waves along the inner circumference of the anode. In other words, the surface of the anode supports creeping waves that propagate around the circumference of the anode in both clockwise and counterclockwise directions. The traveling waves change phase as they travel around the anode and, at certain operating frequencies, look like standing waves, e.g., they are in phase with themselves as they complete one revolution around the anode. These stationary or standing modes perturb and control the phase of the individual resonators, thereby making pi-mode operation for conventional magnetron anodes sometimes difficult or impossible to achieve.

Figure 4:
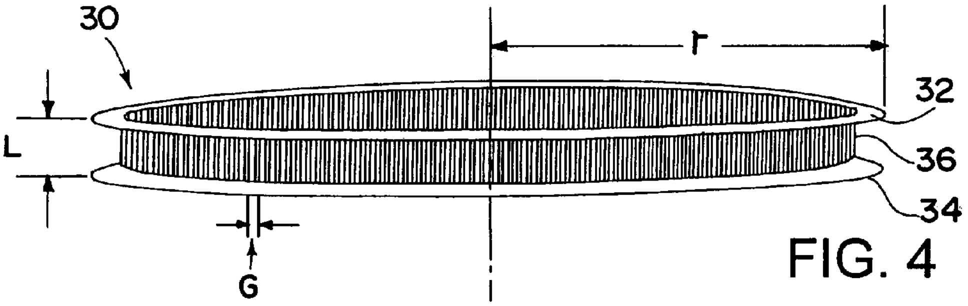
FIG. 4 is an isometric view of an anode in accordance with an embodiment of the invention.

Referring to FIG. 4, an anode 30 in accordance with an embodiment of the present invention is shown. The anode 30 need not include discrete microwave resonators. Instead, resonance is provided by standing wave modes and pi-mode electric fields are developed in conjunction with multiple poles having gaps formed between adjacent poles, wherein the length of the run is greater than the operating wavelength λ, preferably greater than 2λ, and more preferably greater than 3λ. Additionally, in accordance with the present invention a mechanical phase reversal of the poles is introduced every ½λ of the standing wave. Note that the wavelength of the standing and traveling waves is much shorter (about 5-times shorter) than the wavelength of a free-space wave of similar frequency. As used herein, a "run" refers to the length of the anode. An annular anode, for example, has a run that is equal to the circumference of the anode. A flat anode, on the other hand, has a run that is equal to the length of the anode.

In the embodiment of FIG. 4, the anode includes an annular top conductor 32 and an annular bottom conductor 34. The annular conductors have a radius "r" and are arranged to be concentric with respect to each other. A plurality of pins 36, which form a "ring of pins" within the anode 30, have a length "L" and are electrically coupled to the top conductor 32 or to the bottom conductor 34 and extend therefrom, wherein the pins each are separated from adjacent pins by a gap "G". The pins 36 function as anode pole pieces and, as will be discussed below, the gaps between the pins 36 provide fringing fields which interact with a rotating electron cloud (not shown).

The practical limit for the number of pins can be thousands or even millions of pins in a single anode. The large number of pins allows the fabrication of large devices with high power capability that can operate at higher frequencies and shorter wavelengths than magnetrons using conventional anode designs. Moreover, the large devices require only modest magnetic fields for operation.

The radius r of the anode 30 can vary depending on the requirements of the specific application. The length L of the pins affects the frequency of operation of the magnetron. Longer pins reduce the frequency of operation, while shorter pins increase the frequency of operation. Similarly, the pin gap G between pins also affects the frequency of operation of the magnetron. In one embodiment, the gap or spacing between pins is such that there are 10 to 20 pins per standing wavelength along the circumference of the anode. The cross sectional shape of the pins can be rectangular, triangular, circular, or any other geometrical shape.

Figure 5A:
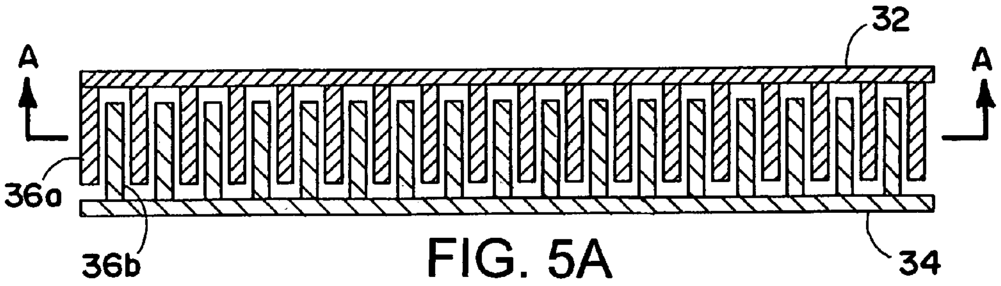
FIG. 5A is a schematic view of the rings of the anode of FIG. 4.

The top and bottom conductors 32, 34 of the anode 30 may be viewed as conductors in a parallel wire transmission line, wherein the transmission line is connected back upon itself in a large circle. As was noted above, some pins 36 are connected to the top conductor, while other pins are connected to the bottom conductor. FIG. 5A illustrates this aspect of the anode, wherein top pins 36*a* are connected to the top conductor 32, and bottom pins 36*b* are connected to the bottom conductor 34. Generally speaking, the pins 36 are configured so as to provide an inter-digitated structure. More specifically, top pins 36*a* of the top conductor 32 mesh with bottom pins 36*b* of the bottom conductor 34. As used herein, mesh refers to an alternating pattern between at least two objects, wherein the objects do not contact one another.

Figure 6A:
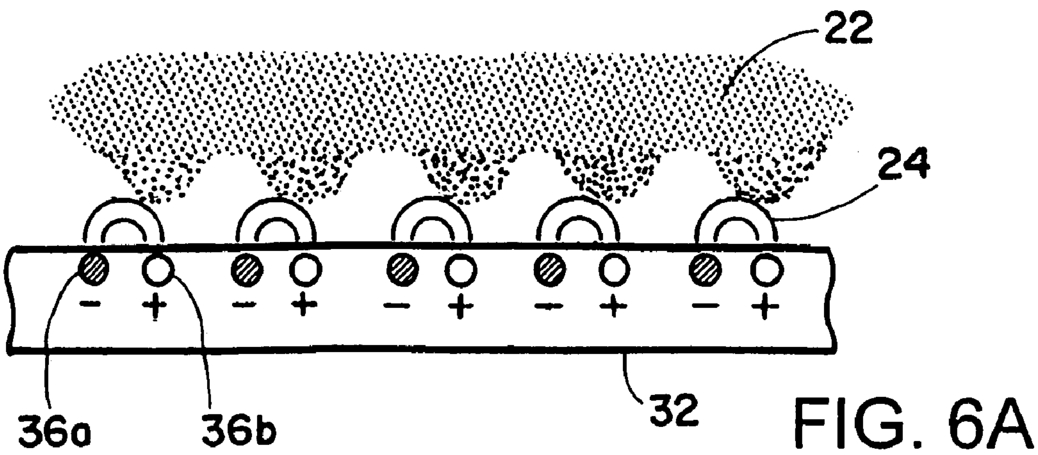
FIG. 6A is a sectional view of the anode of FIG. 1 during pi-mode operation.

The pins 36 connect to a voltage generated by the standing microwave fields on the ring. With reference to FIG. 6A, which is a cross sectional view of the anode of FIG. 5A taken along the section A-A, voltages between adjacent pins 36*a*, 36*b* provide fringing fields 24 that can interact with the circulating electron cloud 22. More specifically, the fringing fields 24 between the pins 36*a*, 36*b* exactly replicate the pi-mode fields of prior art magnetrons devices. Thus, the anode of the present invention can operate in pi-mode without the need for mode control mechanisms, e.g., strapping rings of prior art anodes.

Figure 7A:
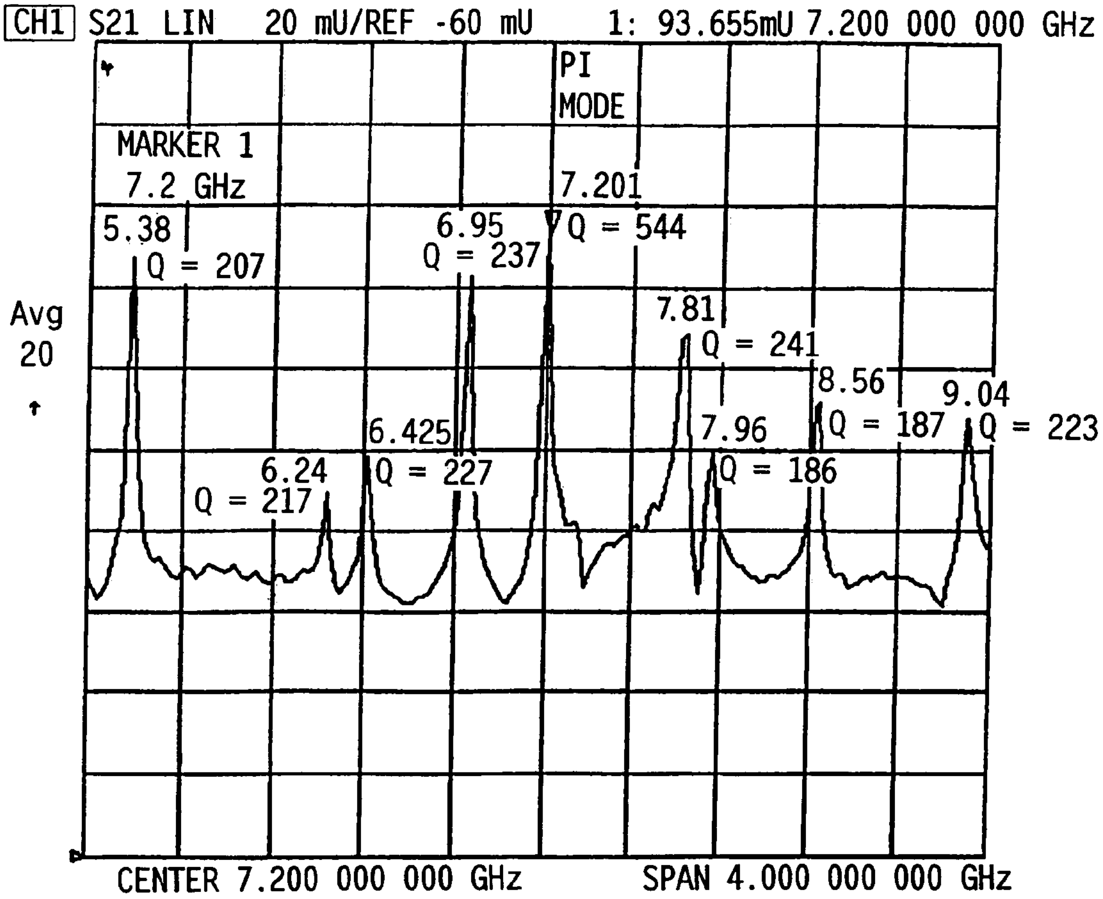
FIG. 7A is a graph illustrating the Q-factor of an embodiment of the anode in accordance with the invention with respect to prior art anodes and, more particularly.

For certain discrete frequencies, the inner circumference of the anode 30 equals an integer number of standing half wavelengths of the operating microwave frequency. At these resonance conditions, the traveling waves of microwave energy are in phase with themselves after each trip around the circumference of the ring and form standing waves. The result is a very high-Q low-loss resonance at a microwave frequency. FIG. 7A shows the results of resonance measurements in a ring of one hundred twenty pins for several modes. More specifically, the discrete modes in a ring of one hundred twenty pins show Q-values around or above 500. The Q of a conventional magnetron resonator is on the order of 100. Thus, the anode of the present invention, when utilized in a magnetron, offers a significant improvement in the Q factor when compared to magnetrons utilizing prior art anodes.

Figure 5B:
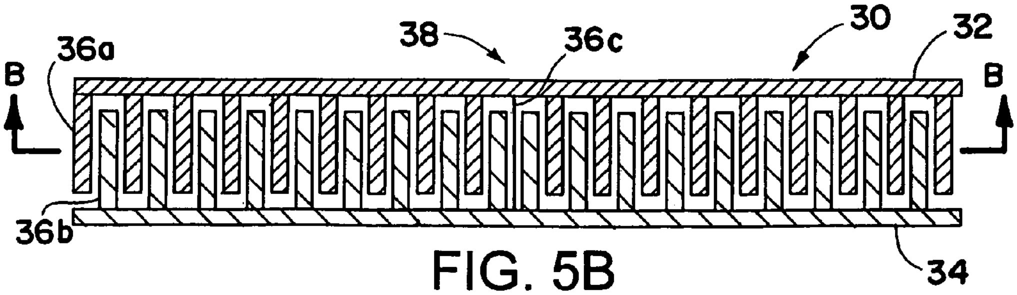
FIG. 5B is a schematic view of the rings of the anode of FIG. 4, illustrating the mechanical phase reversals.
Figure 7B:
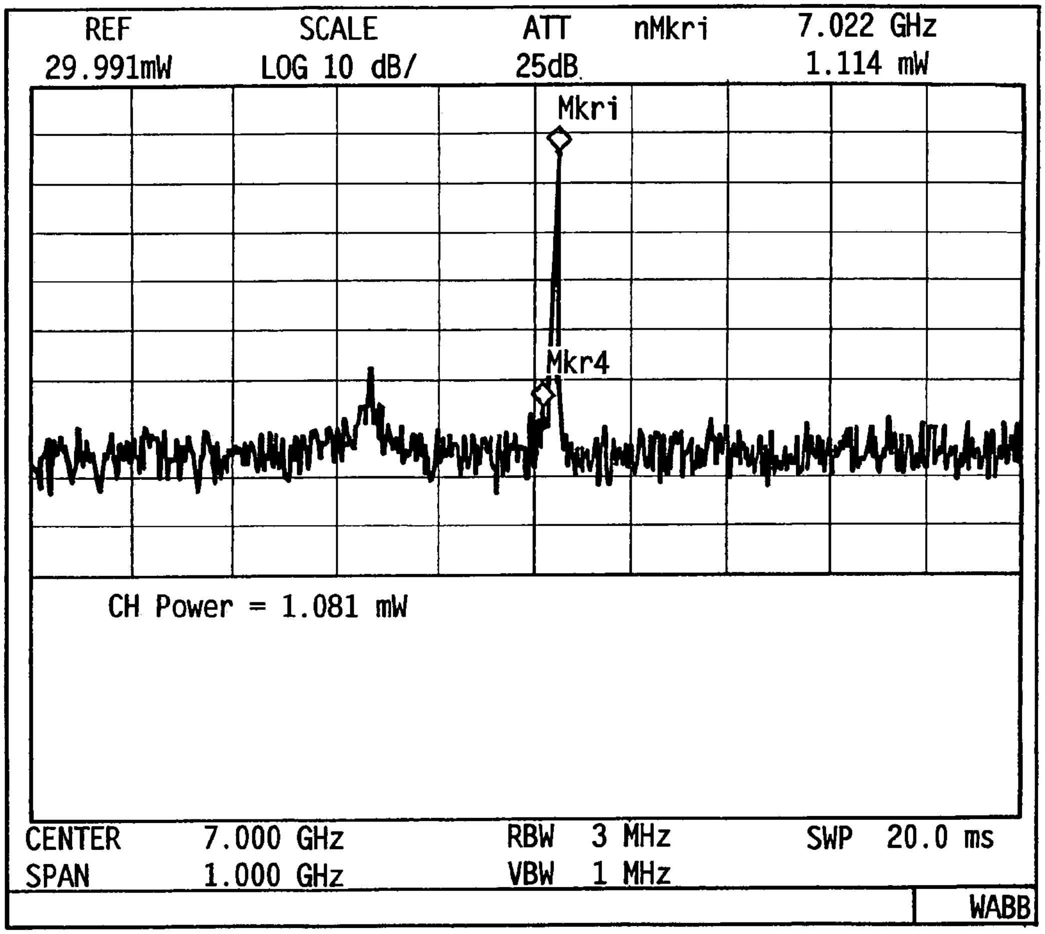
FIG. 7B is a graph of the output power from an embodiment of the anode in accordance with the invention during operation in pi-mode (Note that mechanical phase reversals have preferentially selected oscillation at only one of the modes)

At approximately every half standing wavelength around the ring, the connecting pins 36 are provided with a mechanical phase reversal 38 as shown in FIG. 5B. The microwave standing waves on the ring go through an electrical phase reversal at every half wavelength, and the mechanical phase reversal 38 forces a polarity change between the top pins 36*a* and the bottom pins 36*b* that corresponds with the phase reversal of the standing waves. In other words, the mechanical phase reversal compensates for the microwave phase reversal and, thus, presents continuously in-phase pi-mode fields to the circulating electrons. The mechanical phase reversal ensures that a particular mode of operation, such as a desired single operating frequency, for example, is maintained. FIG. 7B shows the microwave output power from the anode of FIG. 7A where the mechanical phase reversals have been designed to select only one of the possible standing wave modes. The result is a pure single mode operation. As will be appreciated by those skilled in the art, one or more mechanical phase reversals 38 can be placed along the anode to support a single operating mode at any of the possible anode resonances.

The orientation of the phase reversals 38 can alternate between the top conductor 32 and the bottom conductor 34. For example, a first mechanical phase reversal can have both pins coupled to the top conductor 32, and the next mechanical phase reversal can have both pins coupled to the bottom conductor 34.

The mechanical phase reversal can be implemented, for example, by forming the pins 36 such that two pins connected to the same conductor are adjacent to each other. In other words, the pins of one conductor, e.g., the top conductor 32, do not mesh with corresponding pins of the other conductor, e.g., the bottom conductor 34. By this manner, the circulating electrons continually see pi-mode fields which do not reverse in phase and which remain synchronous with the electron motion. The spacing between pins of the mechanical phase reversal is the same as the spacing between other pins, e.g., a gap "G" between pins of the mechanical phase reversal.

The position of the standing wave can float or drift along the surface of the anode. To anchor the position of the standing wave, a shorting bar 36*c* is electrically coupled between the top conductor 32 and the bottom conductor 34, thereby providing a solid reference point. More specifically, the shorting bar 36*c* is placed between one pair of mechanical phase reversals 38. Any remaining mechanical phase reversals do not include the shorting bar 36*c*. With the shorting bar 36*c*, the location of the standing wave is fixed.

Figure 6B:
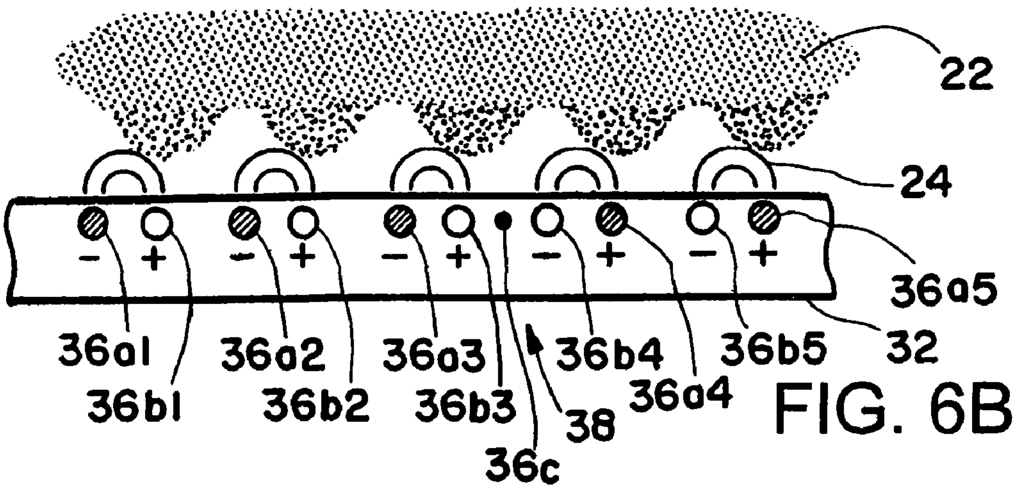
FIG. 6B is a sectional view of the anode of FIGS. 4 and 5 during pi-mode operation, illustrating the effect of the mechanical phase reversal.

FIG. 6B, which is a cross sectional view of the anode of FIG. 5B taken along section B-B, illustrates the effect of the mechanical phase reversal 38 on pi-mode operation. As was previously described, the pins 36 connect to a voltage generated by the standing microwave fields on the ring. Assuming a negative charge develops on a first top pin 36*a*1 and a positive charge develops on an adjacent bottom pin 36*b*1, then a negative charge develops on the next top pin 36*a*2, while a positive charge develops on the next adjacent bottom pin 36*b*2. This pattern, e.g., negative (top pin)-positive (bottom pin), negative (top pin)-positive (bottom pin), etc., continues as before until the mechanical phase reversal 38.

At the mechanical phase reversal 38, two bottom pins 36*b*3, 36*b*4 are adjacent to each other. Following the above pattern, a positive charge develops on bottom pin 36*b*3, a negative charge develops on adjacent bottom pin 36*b*4, and a positive charge develops on the next top pin 36*a*4. Thus, the polarity of the top and bottom pins has been shifted or reversed. Moreover, this reversal corresponds to the phase reversal of the standing waves. Thus, even though the standing waves undergo a phase reversal, thereby changing the polarity of the standing wave voltage, the mechanical phase reversal 38 compensates for the polarity change by changing the polarity of the top and bottom pins, thereby replicating the pi-mode fields of prior art magnetrons and therefore maintaining pi-mode operation. The shorting bar 36*c* locks the position of the standing wave on the anode.

Figure 8A:
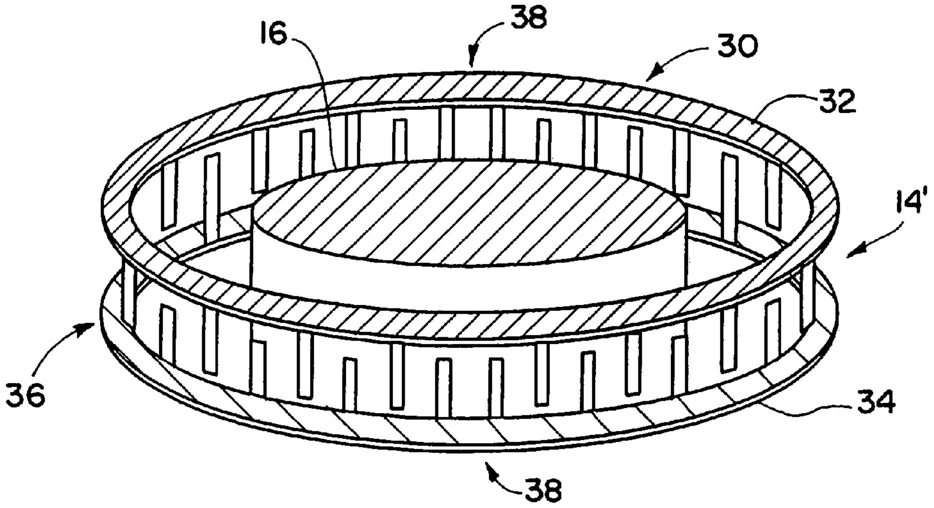
FIG. 8A is an isometric view of a magnetron incorporating an anode in accordance with an embodiment of the present invention.
Figure 8B:
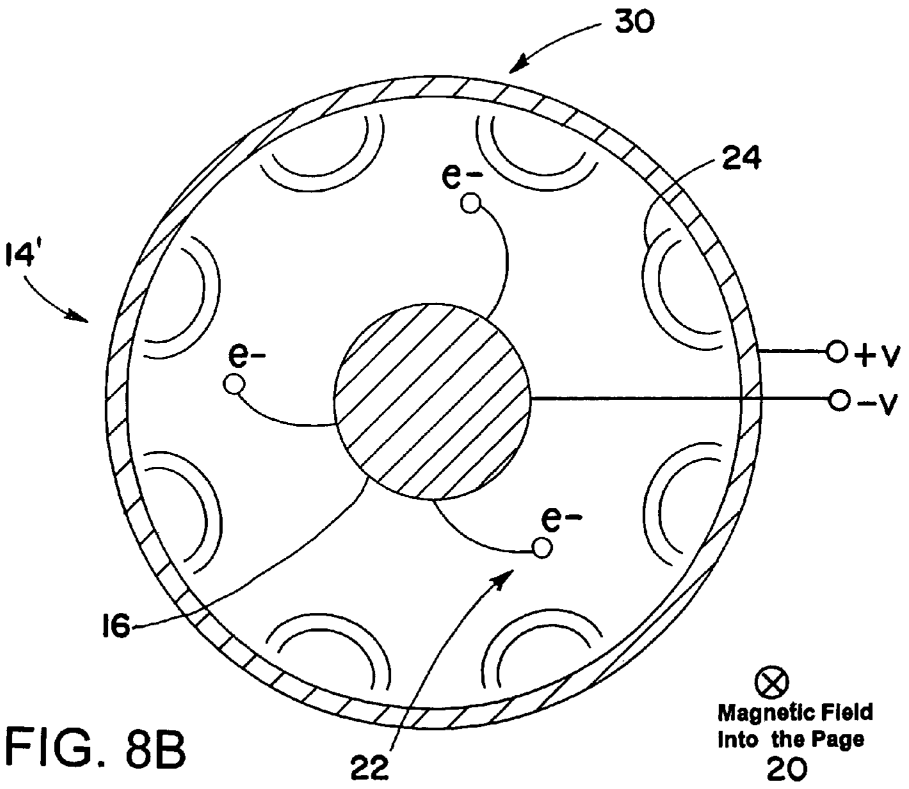
FIG. 8B is a top view of the magnetron of FIG. 8A.

FIGS. 8A and 8B illustrate a magnetron 14' incorporating an anode 30 in accordance with an embodiment of the present invention. The magnetron includes the anode 30 and a cathode 16 separated by an interaction space (or anode-cathode space), electrical contacts +V, −V for applying a voltage to the anode and cathode, and a magnet (not shown), which produces a magnetic field 20. Operation of the magnetron 14' will now be described.

A high voltage (not shown) is applied between the cathode 16 and anode 30 via the contacts +V, −V as is conventional, and the high voltage accelerates electrons from the cathode to the anode, thereby creating a circulating electron cloud 22. As the cloud moves through an interaction space (e.g., the space between the anode and cathode), traveling wave modes, which prevent mode control in magnetrons utilizing conventional anodes, form and develop a charge on the pins 36 that creates fringing fields 24. The fringing fields 24 replicate pi-mode fields of prior art magnetrons. More specifically, and with further reference to FIG. 6B, the traveling wave modes create a resonance whereby a negative charge develops on a first pin 36*a*1 and a positive charge develops on an adjacent pin 36*b*1. The next adjacent pin 36*a*2 develops a negative charge and the next adjacent 36*b*2 pin develops a positive charge, etc. The circulating electron cloud 22 interacts with the developed charge, e.g., electrons are attracted to the positive charge and repelled from the negative charge, thereby efficiently bunching the electron cloud. As the standing waves go through an electrical phase reversal, which occurs at every half wavelength, the mechanical phase reversals 38 force a change in polarity of the pins 36, as shown in FIG. 6B, thereby maintaining pi-mode operation.

The anode 30 of the present invention can be substantially larger than one-wavelength in circumference at the operating frequency while maintaining mode control. This is significant since magnetrons utilizing prior art anodes would experience failure of mode control when the circumference of the anode became larger than approximately one wavelength at the operating frequency. Additionally, the anode of the present invention permits large electron orbits and thus can operate using small magnetic fields at short wavelength operation. Furthermore, and unlike conventional magnetron anodes, the anode 30 permits mode control with a large number of pole pieces.

Figure 9:
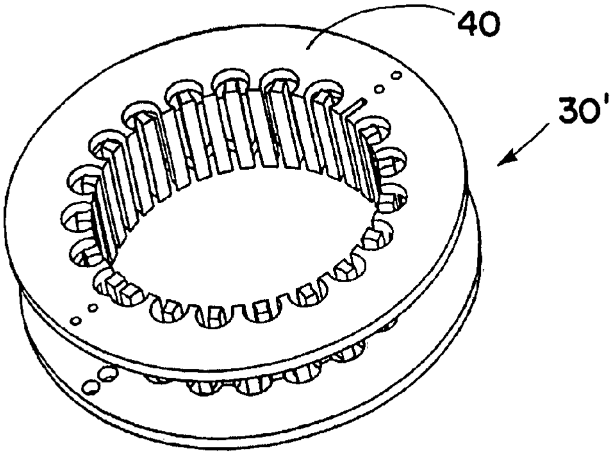
FIG. 9 is an isometric view of an anode in accordance with another embodiment of the invention.

With reference to FIG. 9, a forty pin structure in accordance with an embodiment of the anode is shown. The anode 30' includes a supporting flange 40 integrally formed with the ring of pins 36. During operation, the traveling waves, which circulate about the ring of pins, are closely attached to the space surrounding the pins 36. Significant power levels extend outward from the ring by only about two pin spacings. Thus, the circulating power and mode frequency are largely unaffected by the addition of flanges or support structures. Additionally, the power stays near the pins and does not travel outward on the flanges. As should be appreciated, the size of the flange can vary based on the specific requirements. Moreover, various flange sizes will not degrade performance of the anode.

Figure 10:
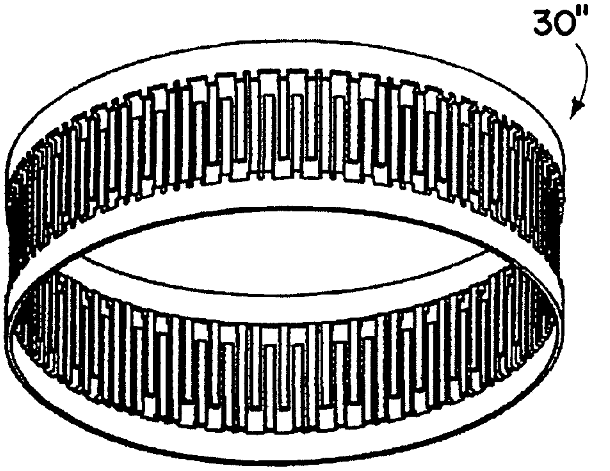
FIG. 10 is an isometric view of an anode in accordance with yet another embodiment of the invention.
Figure 12:
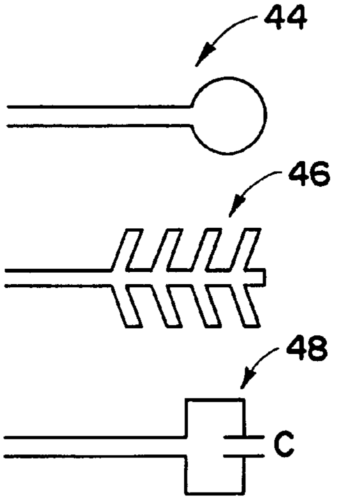
FIG. 12 is a schematic view of several probes in accordance with an embodiment of the invention.
Figure 11:
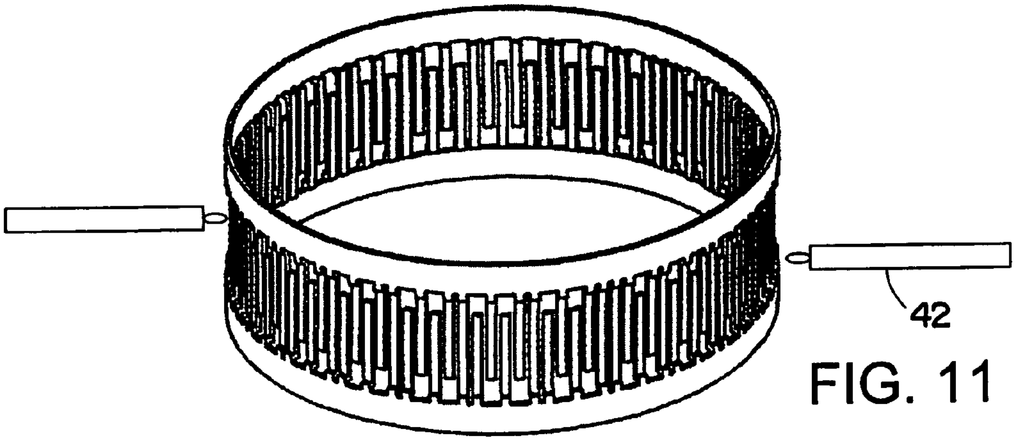
FIG. 11 is an isometric view of an anode and coupling probes in accordance with an embodiment of the invention.

FIG. 10 illustrates a one hundred twenty pin structure in accordance with another embodiment of the anode. The anode 30", in contrast to the embodiment of FIG. 9, has almost no supporting flanges. In both embodiments, output coupling probes 42 are placed closely to the pins 36 to couple to the tightly bound circulating power, as illustrated in FIG. 11. The coupling probes provide a means to deliver the energy from the pins to a remote area or device. The coupling probes can be capacitively and/or inductively coupled to the anode. Inductively and capacitively coupled probes should be placed within two pin-spacings of the ring of pins 36. FIG. 12 illustrates several embodiments of coupling probes, including inductive loops 44, small metal antennas 46, and dielectric probes 48 that sample the electric field of the circulating waves.

Alternatively, the coupling probes 42 can be directly connected to the anode via one of the mechanical phase reversals 38. For example, a first conductor 42*a* can be coupled to one pin 38*a* of a mechanical phase reversal 38 and a second conductor 42*b* can be coupled to a second pin 38*b* of the same mechanical phase reversal 38 wherein the power output is the differential between the two conductors 42*a* and 42*b*. The conductors 42*a* and 42*b* can be coupled at the midpoint of the each respective pin 38*a* and 38*b* of the mechanical phase reversal 38.

Figure 13:
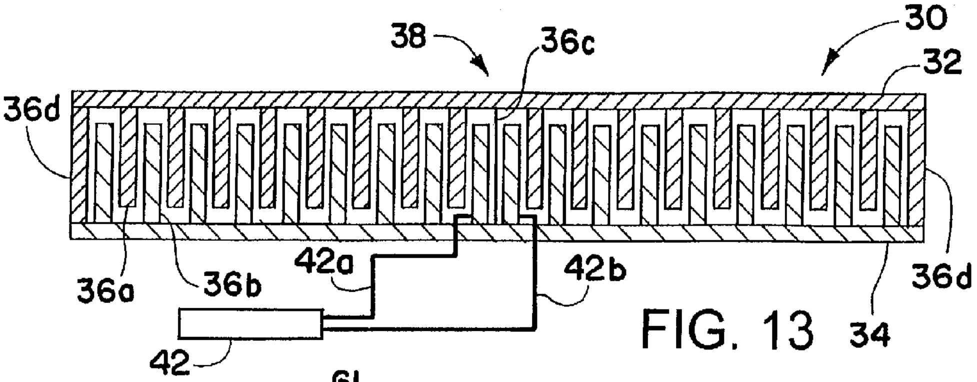
FIG. 13 is a schematic view of the rings of the anode of FIG. 4 illustrating the coupling pins between conductors.

In addition to annlar shaped anodes, non-annular structures also are practical. Similar microwaves resonances found in annular shaped anodes are observed in straight or curved sections of transmission lines that are provided with short-circuit pins 36*d* at their ends, as shown in FIG. 13.

For practical designs that may require very large numbers of pins, it is feasible to break up a large ring into several sectors. Non-ring structures may be used as stand-alone arcs in very large cylindrical magnetrons. An optical resonator can be employed with the arcs to enhance performance at short operating wavelengths. Non-ring structures also can be used in planar (cylindrical) magnetrons devices. Alternatively, a large anode may be formed from several independent subsections that are coupled together to form the anode structure.

Figure 14A:
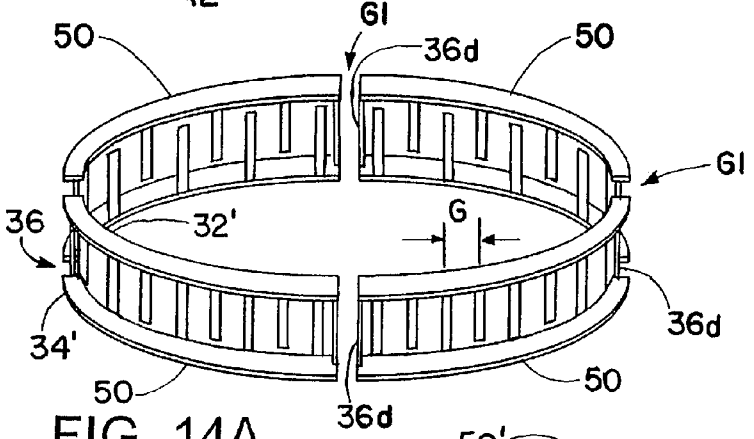
FIG. 14A is an isometric view on an anode structure in accordance with another embodiment of the invention.
Figure 14B:
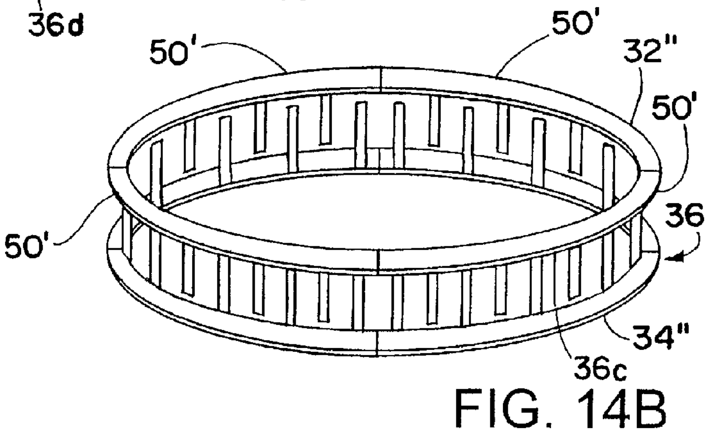
FIG. 14B is an isometric view on an anode structure in accordance with yet another embodiment of the invention.

For example, and with reference to FIG. 14A, four arcs 50 are used to form a general anode structure. The arcs 50 are similar to the anode 30, except they do not form one continuous anode structure, and they include shorting pins 36*d* at the ends of each arc. Each arc is separated from an adjacent arc by a gap G1, wherein G1 is an integer multiple of the gap G between adjacent pins of the arc. Each arc includes a top conductor 32' and a bottom conductor 34', and a plurality of pins 36 connected to the top, bottom or both conductors as previously described. FIG. 14B illustrates an anode similar to the anode of FIG. 14A, except the anode is formed from four separate arcs 50' that are coupled together to form a continuous anode structure. Each arc includes a top conductor 32" and a bottom conductor 34", and a plurality of pins 36 connected to the top, bottom or both conductors.

Figure 15:
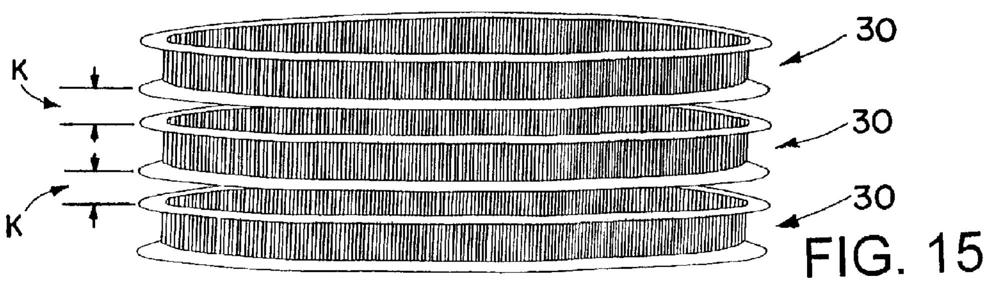
FIG. 15 is an isometric view of three stacked anodes in accordance with an embodiment of the invention.

Anodes in accordance with the present invention may be stacked one above another as shown in FIG. 15. Stacking allows the anode to have a larger area and higher power handling capability than would be possible with a single ring anode design. Additionally, anodes 30 preserve their high-Q low-loss resonance when stacked, provided a minimal spacing "K" exists between the anodes. In general the spacing K between anodes should be no smaller than the spacing G between adjacent pins 36 in the anode. If the spacing K is on the order of two pin spacings, the anodes interact sufficiently to induce frequency locking between anodes. In this manner, a single pi-mode resonator may be constructed with thousands of times the area and power handling capability of conventional magnetrons anode designs.

Accordingly, an anode for use in a magnetron has been disclosed that permits single mode operation while including substantially more than one-hundred pole pieces. Moreover, the anode eliminates the prior art requirement for a multiplicity of microwave resonators. The multiplicity of resonators are replaced with a ring of pins, which serve to provide a high quality microwave resonance and to present pi-mode electric fields to the circulating electron cloud. The circumference of the anode can be substantially larger than one-wavelength of the operating frequency, and the anode, whether cylindrical or planar, may be stacked for large area and high power handling capability. Furthermore, the anode in accordance with the present invention permits large electron orbits and, therefore, small magnetic fields at short wavelength operation. The anode also may be segmented into multiple sectors, thereby facilitating the fabrication of large anode designs.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An electromagnetic radiation source, comprising: an anode comprising:

a first conductor;

a second conductor positioned relative to the first conductor;

a plurality of inter-digitated pole pieces, wherein adjacent pole pieces of the plurality of inter-digitated pole pieces are separated by a gap and are coupled to different ones of the first conductor and the second conductor;

at least one mechanical phase reversal positioned along the first conductor or the second conductor, the mechanical phase reversal operable to force a polarity change on at least one pole piece adjacent to the mechanical phase reversal;

a cathode separated from the anode by an anode-cathode space;

electrical contacts for applying a dc voltage between the anode and the cathode and establishing an electric field across the anode-cathode space; and at least one magnet arranged to provide a dc magnetic field within the anode-cathode space generally normal to the electric field.

2. The electromagnetic radiation source of claim 1, wherein the single mode operation is pi-mode operation.

3. The electromagnetic radiation source of claim 1, wherein resonance occurs along the anode surface due to traveling wave modes.

4. The electromagnetic radiation source of claim 1, wherein one of the at least one mechanical phase reversals includes a shorting bar electrically coupling the top conductor to the bottom conductor.

5. The electromagnetic radiation source of claim 1, wherein the at least one mechanical phase reversal is provided approximately at every half wavelength of a standing wave.

6. The electromagnetic radiation source of claim 1, wherein the mechanical phase reversal comprises two adjacent pole pieces coupled to the top conductor or the bottom conductor.

7. The electromagnetic radiation source of claim 1, wherein the gap provides fringing fields that interact with a rotating electron cloud.

8. The electromagnetic radiation source of claim 7, wherein the fringing fields replicate pi-mode fields.

9. The electromagnetic radiation source of claim 1, wherein the summation of the pole pieces is greater than 20.

10. The electromagnetic radiation source of claim 1, wherein the summation of the pole pieces is greater than 40.

11. The electromagnetic radiation source of claim 1, wherein the summation of the pole pieces is greater than 100.

12. The electromagnetic radiation source of claim 1, wherein the summation of the pole pieces is greater than 120.

13. The electromagnetic radiation source of claim 1, wherein the pole pieces are spaced apart from one another at about 10 about 20 pole pieces per standing wavelength.

14. The electromagnetic radiation source of claim 1, wherein the first conductor and the second conductor are annular.

15. The electromagnetic radiation source of claim 14, wherein an inner circumference of the anode is substantially equal to an integer number of standing half-wavelengths of an operating microwave frequency.

16. The electromagnetic radiation source of claim 15, wherein traveling waves of microwave energy are in phase with themselves after each trip around the anode and form standing waves.

17. The electromagnetic radiation source of claim 14, wherein the circumference of the anode is greater than one wavelength at the operating frequency.

18. The electromagnetic radiation source of claim 1, wherein multiple anodes are stacked one above the other.

19. The electromagnetic radiation source of claim 18, wherein a gap between adjacent anodes is between about one times and two times the gap between adjacent pole pieces.

20. The electromagnetic radiation source of claim 1, wherein at least one of the first and second conductors include a flange.

21. The electromagnetic radiation source of claim 1, further comprising a plurality of output coupling probes.

22. The electromagnetic radiation source of claim 21, wherein the output coupling probes are at least one of inductive loops, metal antennas and dielectric probes.

23. The electromagnetic radiation source of claim 21, wherein the output coupling probes include a first and second conductor, and the first conductor is coupled to a first pin of one of the at least one mechanical phase reversal, and the second conductor is coupled to a second pin of the at least one mechanical phase reversal.

24. The electromagnetic radiation source of claim 21, wherein the coupling probes are placed relative to the anode so as to be within two times the gap between adjacent pole pieces.

25. The electromagnetic radiation source of claim 1, wherein the plurality of pole pieces are pins.

26. The electromagnetic radiation source of claim 24, wherein the pole pieces are at least one of rectangular, triangular and circular in cross section.

27. The electromagnetic radiation source of claim 1, wherein the at least one mechanical phase reversal is a plurality of mechanical phase reversals, and the plurality of mechanical phase reversals are coupled to the first and second conductors in an alternating pattern, wherein adjacent mechanical phase reversals are coupled to a different ones of the first and second conductors.

28. The electromagnetic radiation source according to claim 1, wherein a length of run of the anode is greater than the operating frequency wavelength of the magnetron.

29. The electromagnetic radiation source according to claim 1, wherein a length of run of the anode is greater than two times the operating frequency wavelength of the magnetron.

30. The electromagnetic radiation source according to claim 1, wherein a length of run of the anode is greater than three times the operating frequency wavelength of the magnetron.

31. The electromagnetic radiation source according to claim 1, wherein the anode is segmented into multiple sectors, and each sector includes at least one shorting pin at each end of each sector, wherein each shorting pin electrically shorts the first conductor to the second conductor.

32. The electromagnetic radiation source according to claim 31, wherein the sectors are spaced apart to form the anode.

33. The electromagnetic radiation source according to claim 32, wherein each sector is spaced from an adjacent sector by an integer multiple of the gap between adjacent pole pieces.

34. The electromagnetic radiation source according to claim 1, wherein the anode is segmented into multiple sectors and the sectors are coupled together to form the anode.

35. The electromagnetic radiation source according to claim 1, whereby electrons emitted from the cathode are influenced by the electric and magnetic fields to follow a path through the anode-cathode space and pass in close proximity to the plurality of pole pieces, and the gaps between adjacent pole pieces provide fringing fields which interact with the electrons to produce single mode operation at a desired operating frequency.

36. The electromagnetic radiation source of claim 1, wherein the mechanical phase reversal alters the inter-digitated arrangement of the pole pieces.

37. A magnetron anode for short wavelength operation in a magnetron, comprising:

a first conductor;

a second conductor positioned relative to the first conductor;

a plurality of inter-digitated pole pieces, wherein adjacent pole pieces of the plurality of inter-digitated pole pieces are separated by a gap and are coupled to different ones of the first conductor and the second conductor; and at least one mechanical phase reversal positioned along the first conductor or the second conductor, the mechanical phase reversal operable to force a polarity change on at least one pole piece adjacent to the mechanical phase reversal.

38. The anode of claim 37, wherein one of the at least one mechanical phase reversal includes a shorting bar electrically coupling the top conductor to the bottom conductor.

39. The anode of claim 37, wherein the at least one mechanical phase reversal is provided approximately at every half wavelength of a standing wave.

40. The anode of claim 37, wherein the mechanical phase reversal comprises two adjacent pole pieces coupled to the top conductor or the bottom conductor.

41. The anode of claim 37, wherein the gap provides fringing fields that interact with a rotating electron cloud.

42. The anode of claim 41, wherein the fringing fields replicate pi-mode fields.

43. The anode of claim 37, wherein the summation of the pole pieces is greater than 20.

44. The anode of claim 37, wherein the summation of the pole pieces is greater than 40.

45. The anode of claim 37, wherein the summation of the pole pieces is greater than 100.

46. The anode of claim 37, wherein the summation of the pole pieces is greater than 120.

47. The anode of claim 37, wherein the pole pieces are spaced apart from one another at about 10 to about 20 pole pieces per standing wavelength.

48. The anode of claim 37, wherein the first conductor and the second conductor are annular.

49. The anode of claim 48, wherein an inner circumference of the anode is substantially equal to an integer number of standing half-wavelengths of an operating microwave frequency.

50. The anode of claim 49, wherein traveling waves of microwave energy are in phase with themselves after each trip around the anode and form standing waves.

51. The anode of claim 48, wherein the circumference of the anode is greater than one wavelength at the operating frequency.

52. The anode of claim 37, wherein multiple anodes are stacked one above the other.

53. The anode of claim 52, wherein a gap between adjacent anodes is between about one times and two times the gap between adjacent pole pieces.

54. The anode of claim 37, wherein at least one of the first and second conductors include a flange.

55. The anode of claim 37, further comprising a plurality of output coupling probes.

56. The anode of claim 55, wherein the output coupling probes are at least one of inductive loops, metal antennas and dielectric probes.

57. The anode of claim 55, wherein the output coupling probes include a first and second conductor, and the first conductor is coupled to a first pin of one of the at least one mechanical phase reversal, and the second conductor is coupled to a second pin of the at least one mechanical phase reversal.

58. The anode of claim 55, wherein the coupling probes are placed relative to the anode so as to be within two times the gap between adjacent pole pieces.

59. The anode of claim 37, wherein the plurality of pole pieces are pins.

60. The anode of claim 59, wherein the pins are at least one of rectangular, triangular pins and circular in cross section.

61. The anode of claim 37, wherein the at least one mechanical phase reversal is a plurality of mechanical phase reversals, and the plurality of mechanical phase reversals are coupled to the first and second conductors in an alternating pattern, wherein adjacent mechanical phase reversals are coupled to a different ones of the first and second conductors.

62. The anode of claim 37, wherein the anode is segmented into multiple sectors, and each sector includes at least one shorting pin at each end of each sector, wherein the shorting pin electrically shorts the first conductor to the second conductor.

63. The anode of claim 62, wherein the sectors are spaced apart to form the anode.

64. The anode of claim 63, wherein each sector is spaced from an adjacent sector by an integer multiple of the gap between adjacent pole pieces.

65. The electromagnetic radiation source according to claim 37, wherein the anode is segmented into multiple sectors and the sectors are coupled together to form the anode.

66. The electromagnetic radiation source of claim 37, wherein the mechanical phase reversal alters the inter-digitated arrangement of the pole pieces.

67. A method of producing electromagnetic radiation in a magnetron, said magnetron including an anode, a cathode, electrical contacts for applying a DC voltage between the anode and cathode, and at least one magnet arranged to provide a dc magnetic field within an anode-cathode space generally normal to the electric field, wherein the anode includes a plurality of inter-digitated pole pieces, wherein adjacent pole pieces of the plurality of inter-digitated pole pieces are coupled to different ones of a first conductor and a second conductor, the method comprising the steps of:

applying a voltage to the anode and cathode thereby accelerating electrons from the cathode to the anode, wherein the electrons form a circulating electron cloud;

forming at least one wave mode along a surface of the anode, wherein the wave mode develops a charge on the pole pieces and forms fringing fields; and compensating for a phase reversal of the wave mode, such that continuously in-phase fields are provided to the electron cloud.

68. The method of claim 67, further comprising the steps of: coupling a voltage generated by the at least one wave mode to the pole pieces; and channeling microwave energy away from the pole pieces.

69. The method of claim 68, wherein the step of channeling microwave energy includes the step of using coupling probes to deliver the energy from the pole pieces to a remote area or device.

70. The method of claim 69, wherein the step of using coupling probes includes the step of capacitively and/or inductively coupling the probes to the pole pieces.

71. The method of claim 69, wherein the step of using coupling probes includes the step of directly coupling the probes to the pole pieces.

72. The method of claim 67, wherein the step of compensating for the phase reversal includes the step of compensating for the phase reversal at about every half wavelength of a standing microwave field.

73. An electromagnetic radiation source, comprising:

an anode comprising:

a first conductor;

a second conductor positioned relative to the first conductor;

a plurality of inter-digitated pole pieces, wherein adjacent pole pieces of the plurality of inter-digitated pole pieces are separated by a gap and are coupled to different ones of the first conductor and the second conductor;

at least one mechanical phase reversal positioned along the first conductor or the second conductor, the mechanical phase reversal operable to force a polarity change between pole pieces coupled to the first conductor and pole pieces coupled to the second conductor;

a cathode separated from the anode by an anode-cathode space;

electrical contacts for applying a dc voltage between the anode and the cathode and establishing an electric field across the anode-cathode space; and at least one magnet arranged to provide a dc magnetic field within the anode-cathode space generally normal to the electric field.

* * * * *